United States Patent
Swinderman

(10) Patent No.: US 7,735,620 B2
(45) Date of Patent: Jun. 15, 2010

(54) DUST BUILDUP RESISTANT ACCESS DOOR AND DOOR FRAME OF A BULK MATERIAL HANDLING SYSTEM

(75) Inventor: Robert Todd Swinderman, Palm Coast, FL (US)

(73) Assignee: Martin Engineering Company, Neponset, IL (US)

( * ) Notice: Subject to any disclaimer, the term of this patent is extended or adjusted under 35 U.S.C. 154(b) by 17 days.

(21) Appl. No.: 12/235,124

(22) Filed: Sep. 22, 2008

(65) Prior Publication Data

US 2010/0072038 A1 Mar. 25, 2010

(51) Int. Cl.
*B65G 11/16* (2006.01)
(52) U.S. Cl. .............................. 193/34; 49/371; 49/381; 49/398
(58) Field of Classification Search .................... 193/34, 193/33; 49/371, 381, 398
See application file for complete search history.

(56) References Cited

U.S. PATENT DOCUMENTS

| 1,499,469 A * | 7/1924 | McMinn ...................... 193/34 |
| 1,874,112 A * | 8/1932 | Miller ......................... 193/34 |
| 1,880,370 A * | 10/1932 | Breitwieser .................. 193/34 |
| 2,708,019 A * | 5/1955 | Kluegel et al. ................ 193/34 |
| 7,350,636 B2 * | 4/2008 | Smith et al. .................. 193/33 |
| 2006/0113159 A1* | 6/2006 | Nyquist ...................... 193/33 |

* cited by examiner

*Primary Examiner*—Mark A Deuble
(74) *Attorney, Agent, or Firm*—Thompson Coburn LLP; Clyde L. Smith

(57) ABSTRACT

A bulk material handling system comprising an enclosure, a door frame, and an access door. The door frame is secured to a wall of the enclosure adjacent an access opening. The exterior surface of the door frame is devoid of horizontal surface portions when the enclosure is oriented with the wall of the enclosure in a vertical position. The access door is releasably secured to the door frame and is movable between a closed position and an open position. The exterior surface of the door is devoid of horizontal surface portions when the access door is in the closed position and the enclosure is oriented with the wall of the enclosure in the vertical position.

14 Claims, 6 Drawing Sheets

DUST BUILDUP RESISTANT ACCESS DOOR AND DOOR FRAME OF A BULK MATERIAL HANDLING SYSTEM

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

This invention relates generally to bulk material handling systems.

Bulk material handling systems, such as those for handling or conveying coal or other dust generating bulk materials, often have various enclosures with access doors. Because of the dust generated by the bulk material, dust and debris accumulate on the doors, which make it difficult to open and close the doors.

SUMMARY OF THE INVENTION

The present invention overcomes disadvantages associated with the highly dusty environments of bulk material handling.

One aspect of the invention is a bulk material handling system comprising an enclosure, a door frame, and an access door. The enclosure is adapted for the passage of bulk material. The enclosure comprises a wall having an inner surface and an outer surface. The inner surface of the wall in part defines an interior of the enclosure. The wall includes an access opening for providing access to the interior of the enclosure. The door frame is secured to the wall of the enclosure adjacent the access opening. The door frame has an exterior surface protruding outward from the wall. The exterior surface of the door frame is devoid of horizontal surface portions when the enclosure is oriented with the wall of the enclosure in a vertical position. The access door is releasably secured to the door frame. The access door is movable between a closed position and an open position. The access door is surrounded by the door frame and covers the access opening when the access door is in the closed position. The access door is spaced from the door frame sufficient to allow a user to access the interior of the enclosure via the access opening when the access door is in the open position. The access door has an exterior surface. The exterior surface is devoid of horizontal surface portions when the access door is in the closed position and the enclosure is oriented with the wall of the enclosure in the vertical position.

Another aspect of the present invention is a bulk material handling system comprising an enclosure, a door frame, and an access door. The enclosure is adapted for the passage of bulk material. The enclosure comprises a wall having an inner surface and an outer surface. The inner surface of the wall in part defines an interior of the enclosure. The wall includes an access opening for providing access to the interior of the enclosure. The door frame comprises a plurality of door frame segments. Each of the door frame segments comprises a length of angle iron having first and second panels. The first panel of each door frame segment comprises opposite central and outer edges. The second panel of each door frame segment comprises opposite central and outer edges. The central edges of the first and second panels of each door frame segment are coextensive with each other and constitute an apex of the corresponding door frame segment. Each door frame segment is secured to the wall of the enclosure and is adjacent the access opening such that the apex of such door frame segment protrudes outward and away from the interior of the enclosure. The outer edges of the first and second panels of each door frame segment lie in a plane that is between the apex of the corresponding door frame segment and the interior of the enclosure. The access door is releasably secured to the door frame. The access door is movable between a closed position and an open position. The access door is surrounded by the door frame and covers the access opening when the access door is in the closed position. The access door is spaced from the door frame sufficient to allow a user to access the interior of the enclosure via the access opening when the access door is in the open position.

Another aspect of the present invention is a bulk material handling system comprising an enclosure adapted for the passage of bulk material, a door frame, and an access door. The enclosure comprises a wall having an inner surface and an outer surface. The inner surface of the wall in part defines an interior of the enclosure. The wall includes an access opening for providing access to the interior of the enclosure. The door frame comprises a plurality of door frame segments that in combination generally surround the access opening in the wall of the enclosure. Each door frame segment comprises a generally planar outwardly facing first surface portion and a generally planar outwardly facing second surface portion. The first surface portion of each door frame segment comprises opposite central and outer edges. The second surface portion of each door frame segment comprises opposite central and outer edges. The central edges of the first and second surface portions of each door frame segment are coextensive with each other and constitute an apex of the corresponding door frame segment. Each door frame segment is secured to the wall of the enclosure such that the apex of such door frame segment protrudes outward and away from the interior of the enclosure. The outer edges of the first and second surface portions of each door frame segment lie in a plane that is between the apex of the corresponding door frame segment and the interior of the enclosure. The access door is releasably secured to the door frame. The access door is movable between a closed position and an open position. The access door is surrounded by the door frame and covers the access opening when the access door is in the closed position. The access door is spaced from the door frame sufficient to allow a user to access the interior of the enclosure via the access opening when the access door is in the open position.

Further features and advantages of the present invention, as well as the operation of various embodiments of the present invention, are described in detail below with reference to the accompanying drawings.

Figure 1:
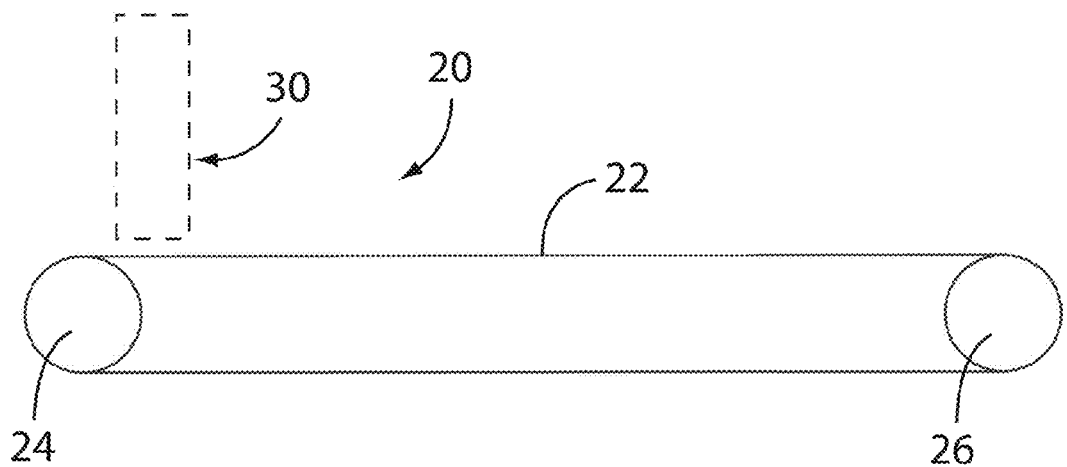
FIG. 1 is a schematic representation of a bulk material handling system.

Reference numerals in the written specification and in the drawing figures indicate corresponding items.

DETAILED DESCRIPTION OF THE PREFERRED EMBODIMENT

Figure 2:
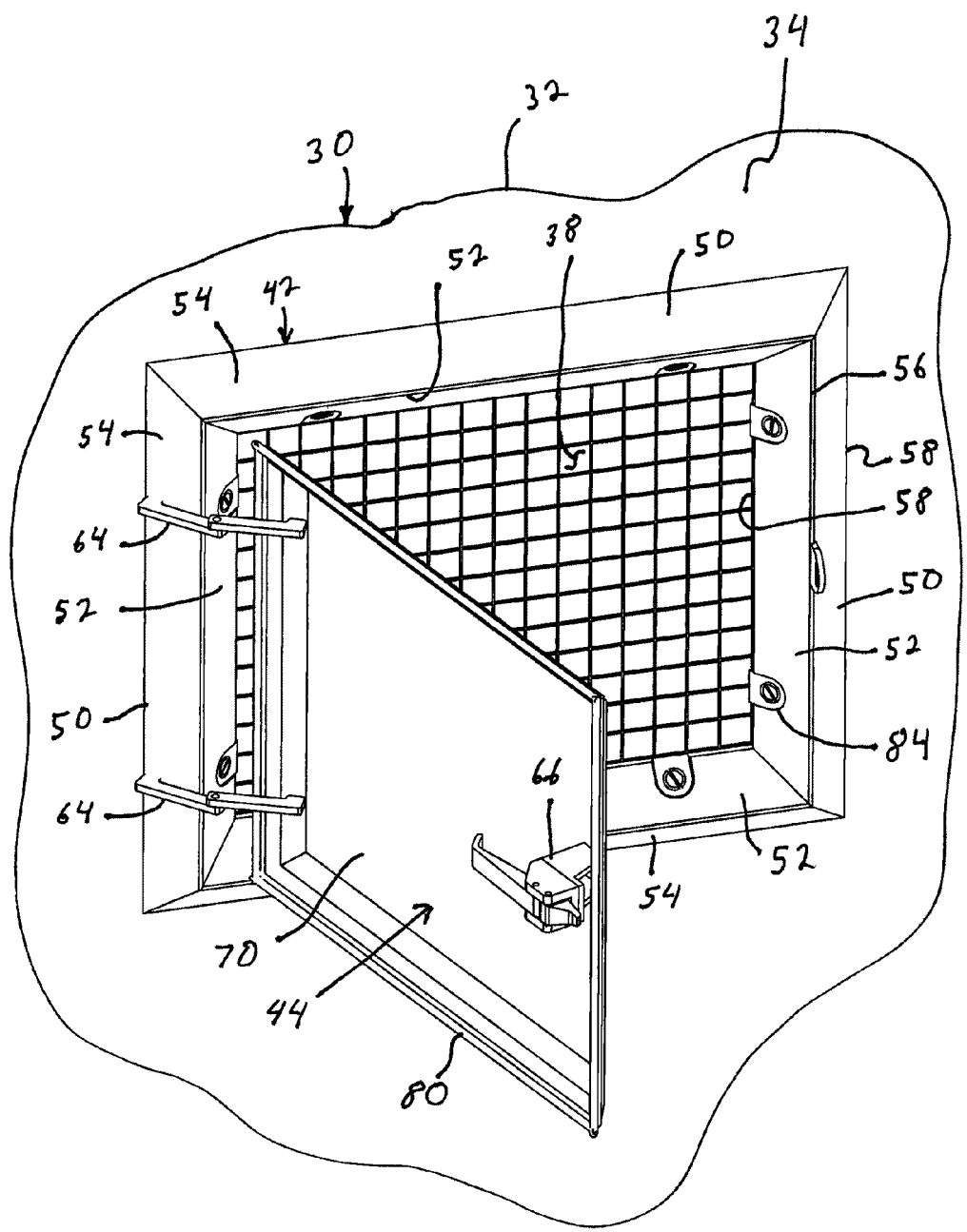
FIG. 2 is a perspective view of an access door and frame assembly on an enclosure of the bulk material handling system of FIG. 1.
Figure 4:
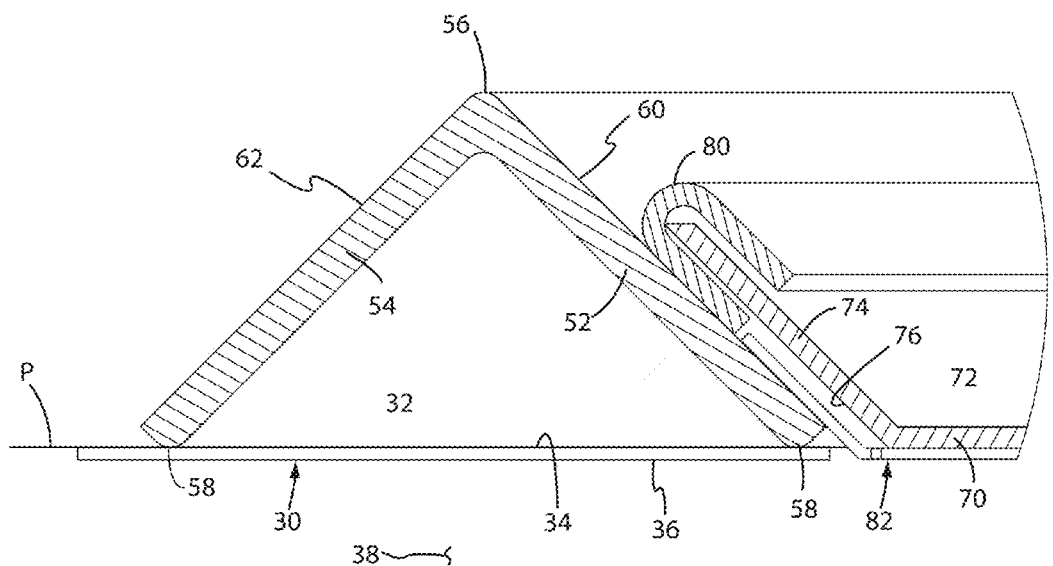
FIG. 4 is an enlarged section view taken along the plane of line 4-4 of FIG. 3.

A bulk material handling system 20 is shown schematically in FIG. 1. The bulk material handling system of FIG. 1 is a conveyor belt system, but it is to be understood that other types of bulk material handling systems could be employed without departing from the scope of the present invention. The bulk material handling system 20 comprises a continuous loop belt 22 driven about rollers 24, 26. The bulk material conveyor belt system 20 further comprises an enclosure (shown schematically by reference numeral 30 in FIG. 1), such as a transfer point loading zone. The enclosure 30 is adapted for the passage of dust generating bulk material, such as coal. Referring to FIG. 2, the enclosure 30 comprises, among other things, a wall 32 having an outer surface 34 and an inner surface 36 (FIG. 4). The inner surface 36 of the wall 32 in part defines an interior 38 of the enclosure The wall 32 includes an access opening 40 for providing access to the interior 38 of the enclosure 30. The bulk material handling system 20 further comprises a door frame, generally indicated at 42, and an access door, generally indicated at 44.

The door frame 42 is secured to the wall 32 of the enclosure adjacent the access opening 40. The door frame 42 has an exterior surface protruding outward from the outer surface 34 of the wall. The door frame 42 comprises a plurality of door frame segments 50 that in combination generally surround the access opening 40 in the wall 32 of the enclosure 30. The present embodiment includes four door frame segment 50 (top and bottom segments and right and left side segments), but it is to be understood that more or fewer door frame segments could be employed without departing from the scope of the present invention. It is also to be understood that each segment could be a separate piece or that the segments could be different portions of a unitary piece. Preferably, the door frame 42 is either cast steel or fabricated from 50 mm×50 mm×5 mm angle iron. The frame 42 may be of other metals or of molded plastic such as ABS. In the present embodiment, each door frame segment 50 comprises a length of angle iron having first and second panels 52, 54. The first panel 52 of each door frame segment comprising opposite central and outer edges 56, 58. The second panel 54 of each door frame segment comprises opposite central and outer edges 56, 58. The central edges of the first and second panels 52, 54 of each door frame segment is coextensive with each other and constitute an apex of the corresponding door frame segment. The apex is also indicated herein by the reference numeral 56. Preferably, each of the first panels 52 includes a generally planar outwardly facing first surface portion 60 (FIG. 4), and each of the second panes 54 includes a generally planar outwardly facing second surface portion 62, with the central and outer edges 56, 58 constituting edges of the surface portions. Each door frame segment 50 is secured to the wall of the enclosure and adjacent the access opening (and preferably surrounding the access opening) such that the apex 56 of such door frame segment protrudes outward and away from the interior 38 of the enclosure 30. The frame 42 may be secured to the outer surface 34 of the wall 32 by spot welding. Alternatively, the frame 42 may be secured by other means, such as via bolts or suitable adhesives. As shown in FIG. 4, the outer edges 58 of the first and second panels 52, 54 of each door frame segment preferably lies in a plane P that is between the apex 56 of the corresponding door frame segment and the interior 38 of the enclosure 30. The exterior surface of the door frame is devoid of horizontal surface portions when the enclosure is oriented with the wall of the enclosure in a vertical position Preferably, the outer surface 34 of the wall 32 of the enclosure 30 is generally planar and, as shown in FIG. 4, the first and second surface portions 60, 62 of the door frame segments 52, 54 are oblique with respect to the outer surface of the wall. More preferably, the plane of each surface portion intersects the plane of the outer surface 34 of the wall at an angle of approximately 45°.

Figure 3:
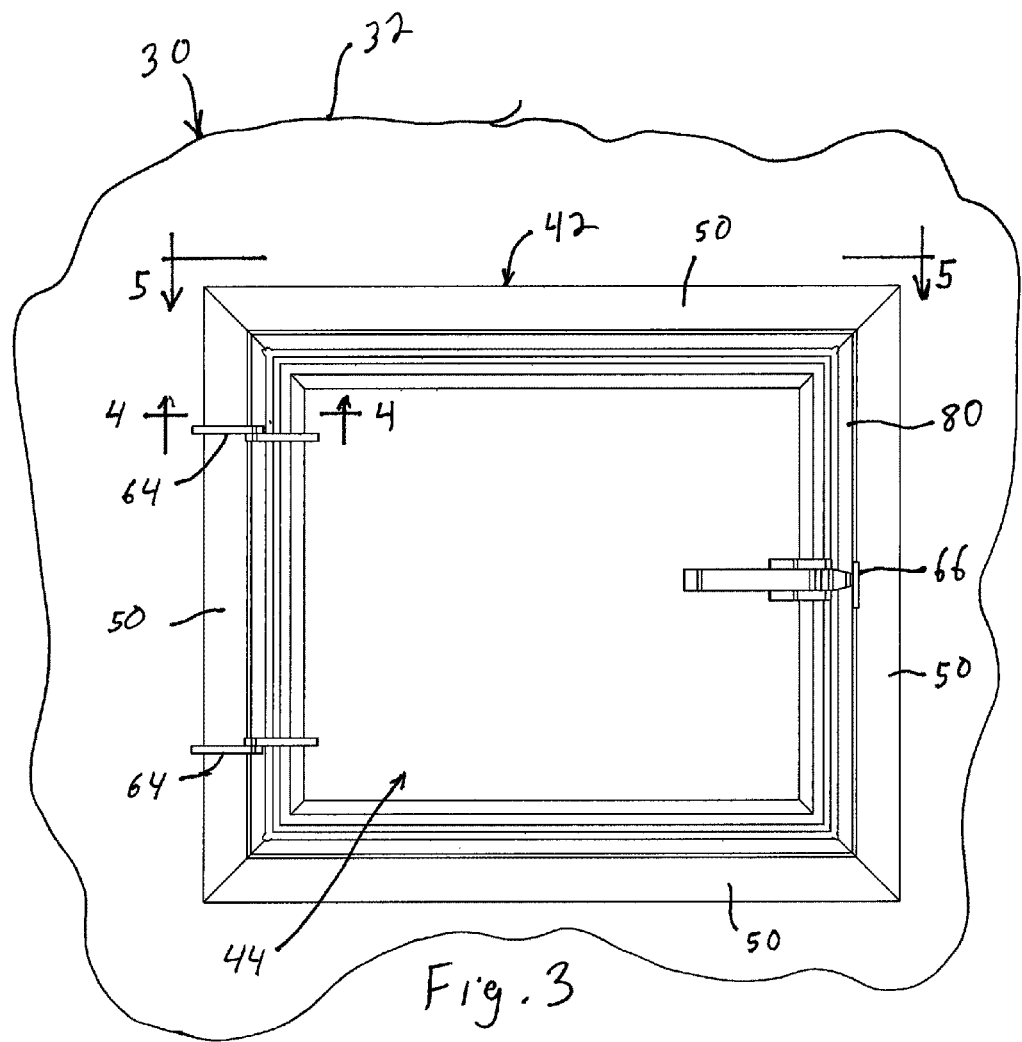
FIG. 3 is a front elevation view of the access door and frame assembly of FIG. 2 with the access door in a closed position.
Figure 5:
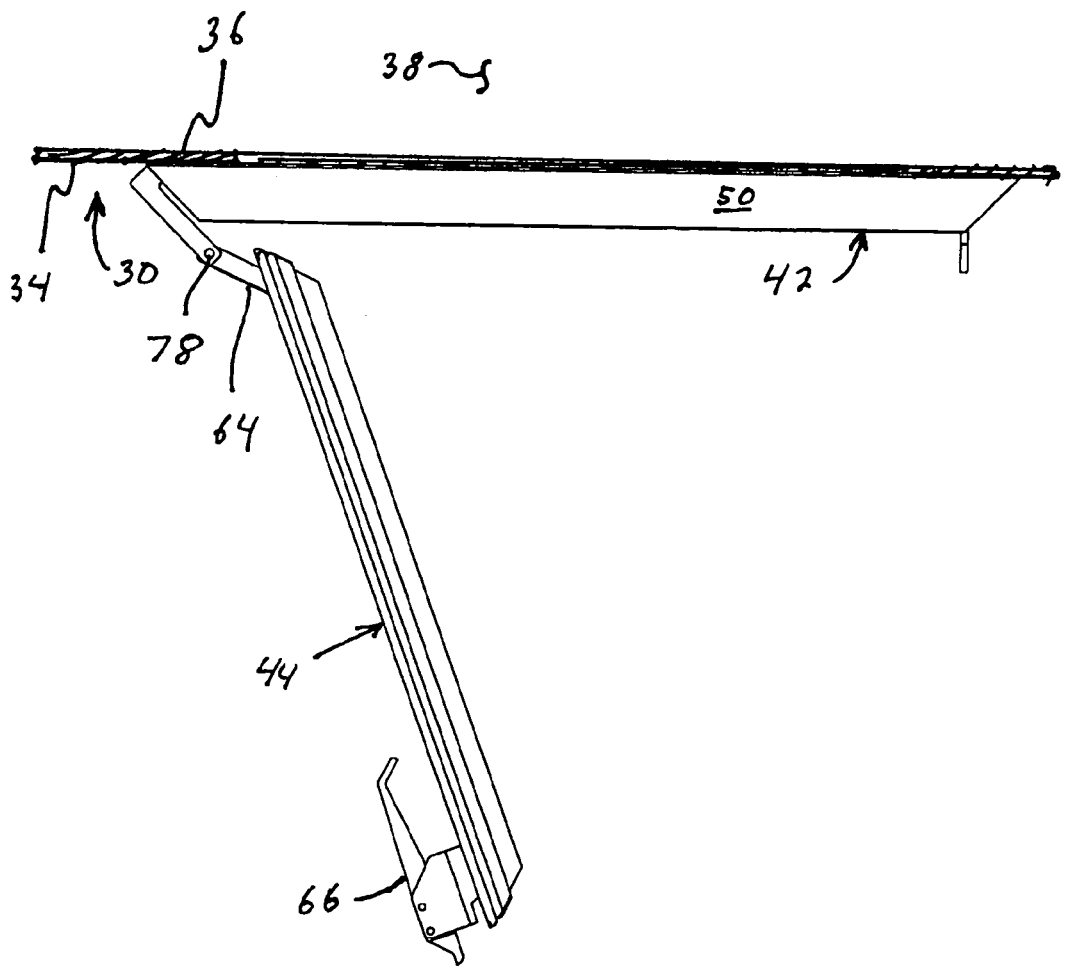
FIG. 5 is a section view taken along the plane of line 5-5 of FIG. 3.

The access door 44 is preferably mounted to one of the door frame segments 50 of the door frame via hinges 64 for pivoting movement of the door between a closed position (see FIG. 3) and an open position (see FIGS. 2 and 5). The access door 44 is spaced from the door frame 42 sufficient to allow a user to access the interior of the enclosure via the access opening when the access door is in the open position. A suitable latch mechanism 66 is provided for latching the access door 44 to door frame 42 when the access door is in the closed position. Preferably, the latch mechanism is of the type made by Southco, e.g., part number A7-10-301-20. The access door 44 includes a central region 70 having a generally planar inner surface 72. Preferably, the inner surface 72 of the central region is generally coplanar with the inner surface 36 of the wall 32 of the enclosure 30 when the access door 44 is in the closed position. The access door 44 also preferably includes edge margins 74 surrounding the central region 70 of the access door. Each edge margin 74 preferably has an inner surface 76 that is oblique to the planar inner surface 72 of the central region 70 of the access door. Also preferably, the inner surface 76 of each edge margin 74 faces and is generally parallel with an opposing one of the first surface portions 60 of one of the door frame segments 50 when the access door is in the closed position (FIG. 2). The hinges are oriented relative to the mounted door frame segment 50 such the door pivots about a pivot line 78 (see FIG. 5). As shown in FIG. 5, the shortest distance between the interior 38 of the enclosure 30 and the pivot line 78 is greater than the shortest distance between interior of the enclosure and the apex 56 of the door frame segment 50 to which the hinges are mounted. The access door 44 is preferably made of 10 gauge mild steel, but may be made from other suitable metals or plastics. The frame and door are preferably powder painted, but can be protected against corrosion by any suitable method, such as galvanizing or epoxy coating.

A door gasket 80 may be provided between the door 44 and door frame 42 when the door is in the closed position to seal the door. Preferably, the gasket 80 is a rubber, spring clip-on gasket, such as those sold by Hatch, e.g., part number 11B10B7x3/16C. High temperature versions of the seal may be desirable on some applications. The gasket 80 is secured to the edge margins 74.

A barrier guard or screen assembly 82 may be secured to the door frame 42 for preventing unauthorized access into the interior of the enclosure. The screen assembly 82 is preferably made from 12 gauge stainless steel mesh with openings 25 mm square or smaller. Other screen materials may be used, such as galvanized mesh or plastic. The screen assembly 82 has mounting tabs 84 for securement to the frame. The screen assembly is attached to the frame with fasteners, e.g., screws, that require a tool for removal. The screen assembly is positioned such that it is interior of the central region 70 of the door 44 so that it does not interfere with the closure of the door and so that it does not prevent the inner surface of the central region of the door from being generally flush with the inner surface of the wall of the enclosure when the access door is in the closed position. Additionally, the frame includes recesses for receiving the mounting tabs 84 so that the tabs do not affect the closure of the door 44 or the seal of the gasket 80.

Because the door frame 42 and door 44 are devoid of horizontal surfaces, they shed materials on the exterior and resist the buildup of bulk material dust and spillage. Also, because the inner surface 72 of the central region 70 of the access door is flush with the inner surface 36 of the wall 32 of the enclosure 30 when the access door is in the closed position, the door resists buildup on the inside of the door.

Figure 6:
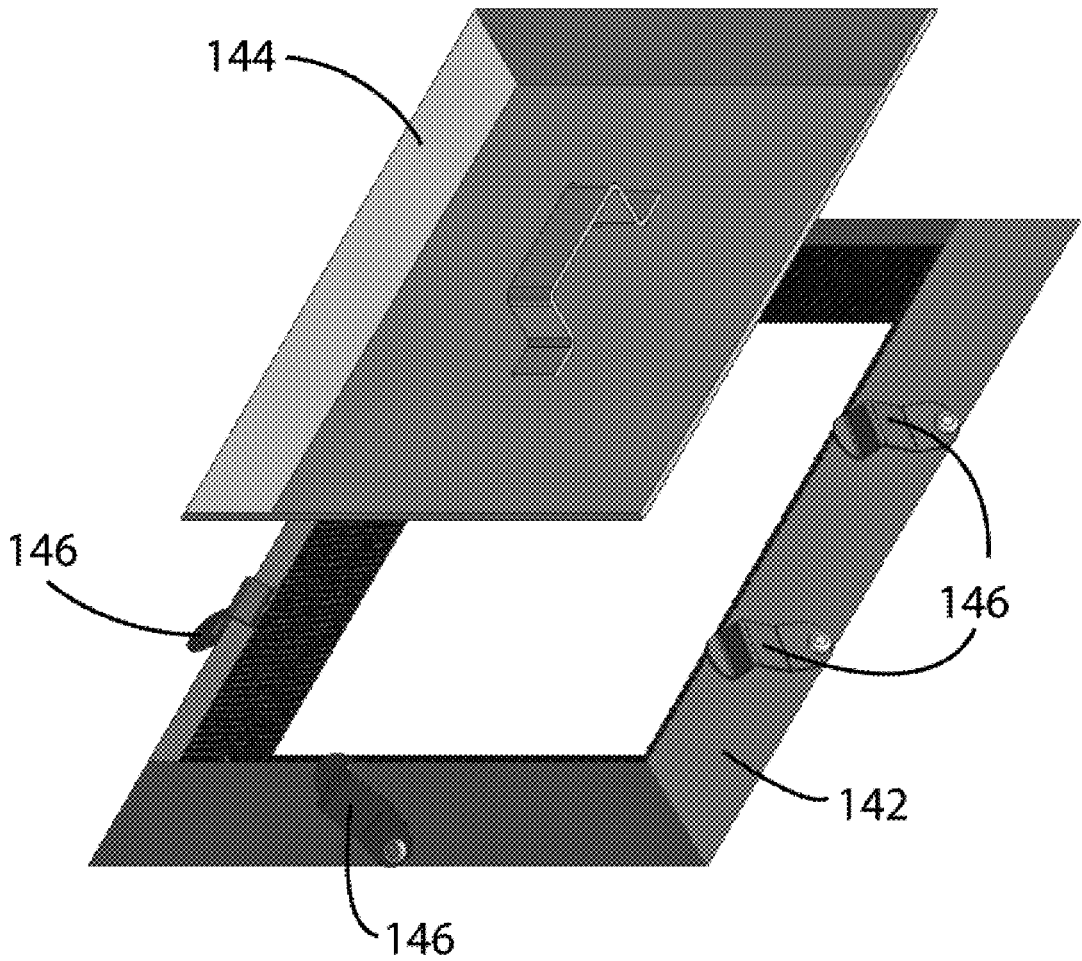
FIG. 6 is a perspective view showing an alternative embodiment of an access door and frame assembly.

Another embodiment of a frame and door is shown in FIG. 6. The frame 142 and door 144 of FIG. 6 are similar to the frame 42 and door 44 of FIGS. 2-5, except they include locking tabs 146 instead of hinges and the latch assembly. With the door 144 and frame 142 of this embodiment, the door is secured in its closed position with the locking tabs 146. The door 144 is moved from its closed position to its open position by unlocking the locking tabs 146 and removing the door from the frame 142.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of the preferred embodiment of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations.

What is claimed is:

1. A bulk material handling system comprising:
   an enclosure adapted for the passage of bulk material, the enclosure comprising a wall having an inner surface and an outer surface, the inner surface of the wall in part defining an interior of the enclosure, the wall including an access opening for providing access to the interior of the enclosure;
   a door frame secured to the wall of the enclosure adjacent the access opening, the door frame having an exterior surface protruding outward from the wall, the exterior surface of the door frame being devoid of horizontal surface portions when the enclosure is oriented with the wall of the enclosure in a vertical position;
   an access door releasably secured to the door frame, the access door being movable between a closed position and an open position, the access door being surrounded by the door frame and covering the access opening when the access door is in the closed position, the access door being spaced from the door frame sufficient to allow a user to access the interior of the enclosure via the access opening when the access door is in the open position, the access door having an exterior surface, the exterior surface being devoid of horizontal surface portions when the access door is in the closed position and the enclosure is oriented with the wall of the enclosure in the vertical position, the access door comprising a central region having a generally planar inner surface, the inner surface of the central region being generally coplanar with the inner surface of the wall of the enclosure when the access door is in the closed position, the access door comprising edge margins surrounding the central region of the access door, each edge margin having an inner surface that is oblique to the planar inner surface of the central region of the access door.

2. A bulk material handling system comprising:
   an enclosure adapted for the passage of bulk material, the enclosure comprising a wall having an inner surface and an outer surface, the inner surface of the wall in part defining an interior of the enclosure, the wall including an access opening for providing access to the interior of the enclosure;
   a door frame comprising a plurality of door frame segments, each of the door frame segments comprising a length of angle iron having first and second panels, the first panel of each door frame segment comprising opposite central and outer edges, the second panel of each door frame segment comprising opposite central and outer edges, the central edges of the first and second panels of each door frame segment being coextensive with each other and constituting an apex of the corresponding door frame segment, each door frame segment being secured to the wall of the enclosure and adjacent the access opening such that the apex of such door frame segment protrudes outward and away from the interior of the enclosure, the outer edges of the first and second panels of each door frame segment lying in a plane that is between the apex of the corresponding door frame segment and the interior of the enclosure;
   an access door releasably secured to the door frame, the access door being movable between a closed position and an open position, the access door being surrounded by the door frame and covering the access opening when the access door is in the closed position, the access door being spaced from the door frame sufficient to allow a user to access the interior of the enclosure via the access opening when the access door is in the open position.

3. A bulk material handling system as set forth in claim 2 wherein the access door includes a central region having a generally planar inner surface, the inner surface of the central region being generally coplanar with the inner surface of the wall of the enclosure when the access door is in the closed position.

4. A bulk material handling system as set forth in claim 3 wherein the access door includes edge margins surrounding the central region of the access door, each edge margin having an inner surface that is oblique to the planar inner surface of the central region of the access door.

5. A bulk material handling system as set forth in claim 4 further comprising at least one hinge, the access door being pivotally mounted to one of the door frame segments via the hinge, the hinge being oriented relative to said one of the door frame segments such the door pivots about a pivot line, the shortest distance between the pivot line and the interior of the enclosure being greater than the shortest distance between the apex of said one of the door frame segments and the interior of the enclosure.

6. A bulk material handling system as set forth in claim 5 further comprising a latch mechanism for latching the access door to door frame when the access door is in the closed position.

7. A bulk material handling system as set forth in claim 2 wherein the outer edges of the panels of each of the door frame segments are in contact with the outer surface of the wall of the enclosure.

8. A bulk material handling system comprising:

an enclosure adapted for the passage of bulk material, the enclosure comprising a wall having an inner surface and an outer surface, the inner surface of the wall in part defining an interior of the enclosure, the wall including an access opening for providing access to the interior of the enclosure;

a door frame comprising a plurality of door frame segments that in combination generally surround the access opening in the wall of the enclosure, each door frame segment comprising a generally planar outwardly facing first surface portion and a generally planar outwardly facing second surface portion, the first surface portion of each door frame segment comprising opposite central and outer edges, the second surface portion of each door frame segment comprising opposite central and outer edges, the central edges of the first and second surface portions of each door frame segment being coextensive with each other and constituting an apex of the corresponding door frame segment, each door frame segment being secured to the wall of the enclosure such that the apex of such door frame segment protrudes outward and away from the interior of the enclosure, the outer edges of the first and second surface portions of each door frame segment lying in a plane that is between the apex of the corresponding door frame segment and the interior of the enclosure;

an access door releasably secured to the door frame, the access door being movable between a closed position and an open position, the access door being surrounded by the door frame and covering the access opening when the access door is in the closed position, the access door being spaced from the door frame sufficient to allow a user to access the interior of the enclosure via the access opening when the access door is in the open position.

9. A bulk material handling system as set forth in claim 8 wherein the outer surface of the wall of the enclosure is generally planar and wherein the first and second surface portions of the door frame segments are oblique with respect to the outer surface of the wall of the enclosure.

10. A bulk material handling system as set forth in claim 8 wherein the access door includes a central region having a generally planar inner surface, the inner surface of the central region being generally coplanar with the inner surface of the wall of the enclosure when the access door is in the closed position.

11. A bulk material handling system as set forth in claim 8 wherein the access door includes edge margins surrounding the central region of the access door, each edge margin having an inner surface that is oblique to the planar inner surface of the central region of the access door.

12. A bulk material handling system as set forth in claim 11 wherein the inner surface of each edge margin faces and is generally parallel with one of the first surface portions of one of the door frame segments when the access door is in the closed position.

13. A bulk material handling system as set forth in claim 12 further comprising a door gasket between the door and door frame when the door is in the closed position.

14. A bulk material handling system as set forth in claim 13 further comprising a screen interior of the access door and secured to the door frame for preventing unauthorized access into the interior of the enclosure.

* * * * *